United States Patent [19]
Mellen, Sr.

[11] 4,423,516
[45] Dec. 27, 1983

[54] DYNAMIC GRADIENT FURNACE WITH CONTROLLED HEAT DISSIPATION

[76] Inventor: Robert H. Mellen, Sr., P.O. Box 535, New London, N.H. 03257

[21] Appl. No.: 360,327

[22] Filed: Mar. 22, 1982

[51] Int. Cl.³ .............................................. F27B 5/00
[52] U.S. Cl. .................................. 373/111; 373/119; 373/127; 373/130; 219/390
[58] Field of Search ............... 373/110, 111, 117, 119, 373/127, 130; 219/551, 550, 390

[56] References Cited

U.S. PATENT DOCUMENTS

| Re. 27,065 | 2/1971 | Lang | 373/127 |
| 2,491,210 | 12/1949 | Rennie | 373/119 X |
| 4,086,424 | 4/1978 | Mellen, Sr. | 373/136 |
| 4,124,199 | 11/1978 | Jones et al. | 373/110 X |
| 4,195,820 | 4/1980 | Berg | 373/136 |

Primary Examiner—Roy N. Envall, Jr.
Attorney, Agent, or Firm—Thomas N. Tarrant

[57] ABSTRACT

A furnace producing a precisely controlled temperature gradient within a central bore by a plurality of heating elements sandwiched between respective insulating layers with each heating element loosely thermally coupled to a thermally conductive ring extending concentrically outward from the furnace bore. Thermal sensors at each layer provide data to data processing equipment which controls and moves temperature gradients within the furnace by program.

6 Claims, 8 Drawing Figures

DYNAMIC GRADIENT FURNACE WITH CONTROLLED HEAT DISSIPATION

BACKGROUND OF THE INVENTION

1. Field of the Invention

The present invention relates to furnaces designed to establish a temperature gradient in the work volume and particularly to such furnaces capable of varying the temperature gradient under precise control.

2. Description of the Prior Art

Temperature gradient furnaces are used in a number of production processes. One example is in the "growing" of large monocrystals. A steep and well-controlled temperature gradient is necessary. The simplest and most common approaches have been to provide a static temperature gradient within the furnace and then either: (a) move the work through the gradient holding the furnace stationary or (b) move the furnace while holding the work stationary. In U.S. Pat. No. 4,086,424 issued to the present inventor, a furnace and method are described in which both furnace and work remain stationary while the temperature gradient within the furnace is made to move. In any of these furnaces, it is difficult to obtain good precision control over the temperature gradient or gradients unless good control is established over heat dissipation. One problem is the result of heat flow radially to the axis of the temperature gradient. Such heat flow produces undesired temperature variations within planes perpendicular to the axis of the gradient. Another problem is related to loading of the heating elements. Unless a heating element is continually loaded, its response to control can be slow and erratic. In order to obtain steep uniform gradients, these problems have to be overcome.

SUMMARY OF THE INVENTION

In accordance with the invention, a furnace is provided with a plurality of individually controlled heating elements, each arranged symmetrically around the axis of the furnace chamber and layered sequentially with separating thermally insulating layers. Each heating element is positioned concentrically within a respective thermally conductive annulus that is loosely thermally coupled to the element and is also thermally coupled to a heat dissipating medium. Temperature sensors adjacent the heating elements provide data to data processing apparatus programmed to provide the desired gradients by controlling energy input to the individual heating elements.

Further objects and features of the invention will become apparent upon reading the following description together with the drawing.

DESCRIPTION OF THE PREFERRED EMBODIMENT

The invention requires that dissipating heat flow in the work volume be axial with the axis of the imposed temperature gradient rather than radial. In a common furnace configuration the furnace will be cylindrical as in FIG. 1 and the work volume (heated chamber) will also be cylindrical in the form of a cylindrical bore. The axis of the cylindrical bore will then be the axis of the temperature gradient. The work chamber may take other geometrical shapes, but there will always be an axis along which the temperature gradient is imposed. To confine heat flow in the work volume to axial flow, the invention provides a net input of energy at each and every plane along the gradient axis. This prevents radial heat dissipation from the work volume so that all dissipating heat flow in the work area is axial.

Figure 1:
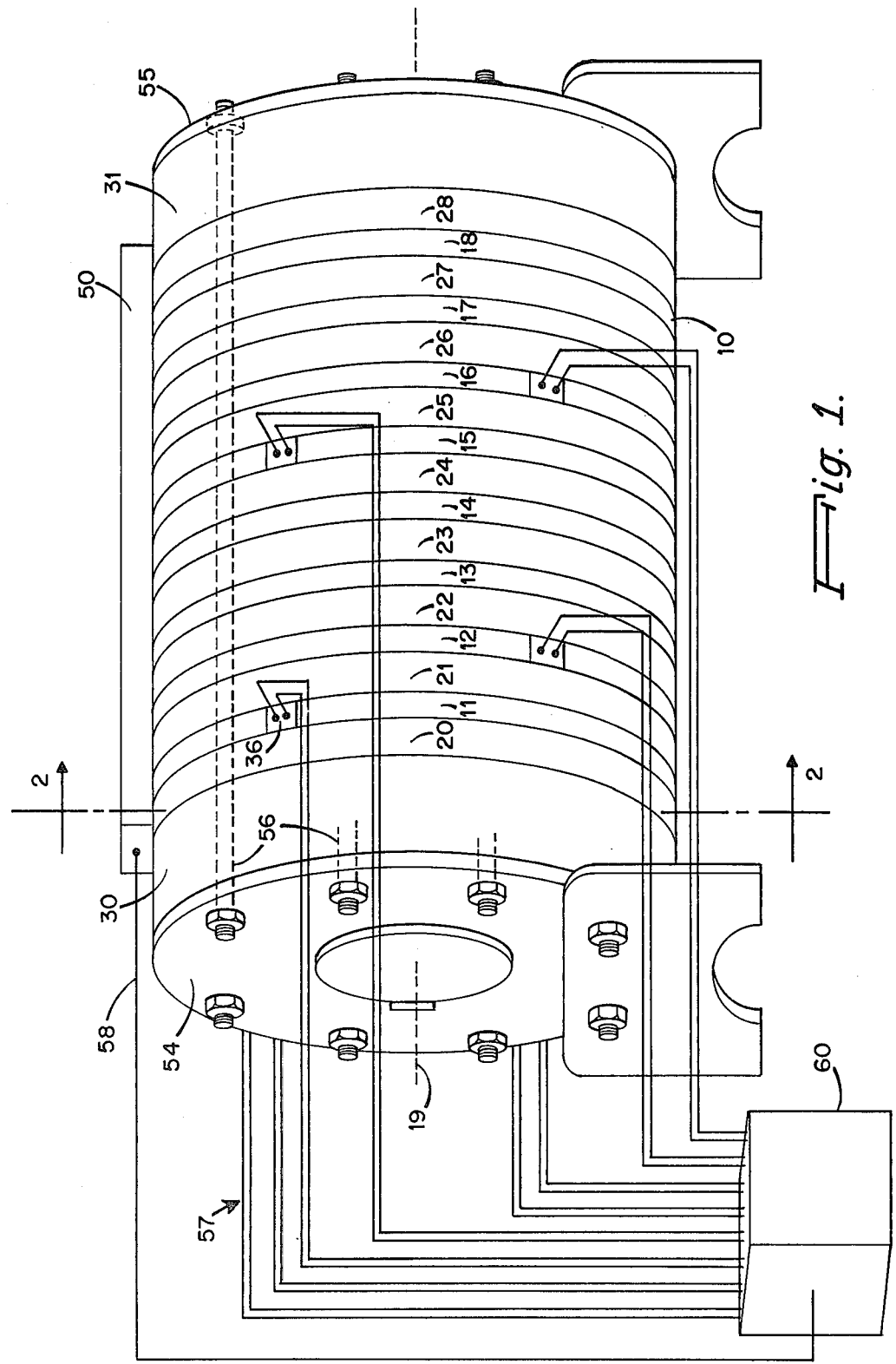
FIG. 1 is a projection of the inventive furnace partially diagramatic.

To accomplish the above, furnace 10, as shown in FIG. 1, has eight temperature controlled planes rimmed by thermally conductive annuli 11 through 18. Annuli 11 through 18 are all parallel and normal to bore axis 19 of furnace 10. Annuli 11 through 18 are each sandwiched between thermally insulating layers 20 through 28. Insulated ends 30 and 31 minimize heat dissipation at the ends of furnace 10.

Furnace 10, as depicted in FIG. 1, is in the configuration of a cylinder with its central axis 19 horizontal. Other shapes can be used, but the cylindrical shape is best adapted to uniform heating. The attitude of the cylinder is noncritical. Annuli 11 through 18 can be made from many thermally conductive materials. Aluminum has been used since it is inexpensive and simple to cast or machine in the desired configurations.

Figure 3:
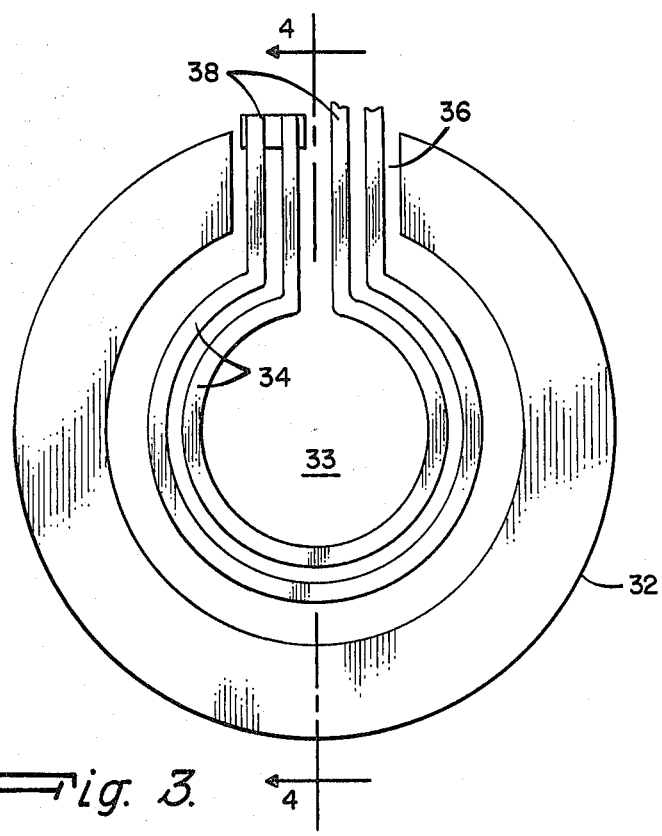
FIG. 3 is an elevation of a conductive annulus and a heating element according to the invention
Figure 4:
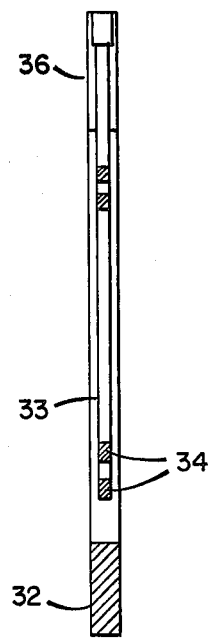
FIG. 4 is a cross-section taken along line 4—4 of FIG. 3.

FIGS. 3 and 4 depict one of conductive annuli 11 through 18 in the form of circular aluminum ring 32. The diameter of ring 32 is not critical, but will normally be in the range of ten to forty centimeters. Central aperture 33 provides space for aligned heating element 34. Element 34 is depicted as a double circular element about 3 mm thick.

Segment 36 in outer rim 37 of ring 32 is cut out to leave space for terminals 38 of element 34. While the drawing and description are directed to an electrically heated furnace, there is no requirement that element 34 be electric. For example, element 34 could be tubing carrying a heated fluid. Thus, while segment 36 is depicted as providing space for emergence of electric terminals 38, other types of connections may be used.

Ring 32 may take a number of design configurations as may element 34. Where ring 32 is electrically conductive, it must be electrically insulated from an electrical heating element 34. Also in some furnaces, the heating elements will reach substantially higher temperatures than the conductive annuli can sustain without damage. In these cases the annuli, such as ring 32 must be insulated from element 34 sufficiently to prevent damage to ring 32.

Figure 5:
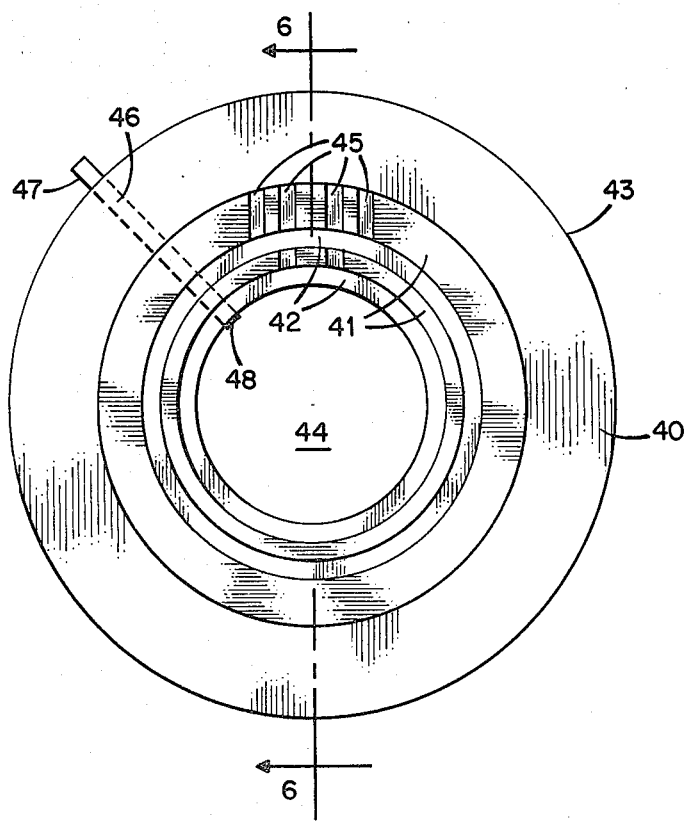
FIG. 5 is an elevation of an insulating layer in accordance with the invention.
Figure 6:
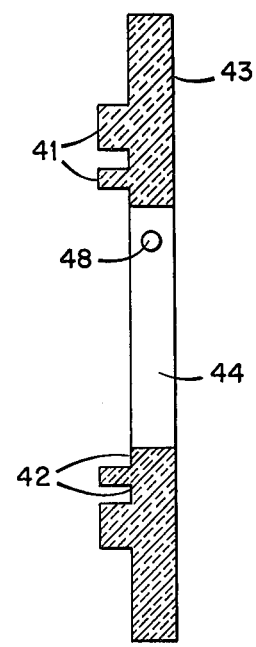
FIG. 6 is a cross-section taken along line 6—6 of FIG. 5.

FIGS. 5 and 6 depict one of insulating layers 20 through 28 in the form of disk 40. Disk 40 is made of a refractory thermally insulating material such as porous ceramic or clay. Disk 40 as depicted is molded with lands 41 and grooves 42 for mating with and supporting element 34. Rim portion 43 is molded to receive ring 32. Central aperture 44 defines the bore of the furnace. Disk 40 has exit grooves 45 leading from grooves 42 for the portions of element 34 leading to terminals 38. The radial thickness of land 41 separating heating element 34 from ring 32 controls the thermal coupling between ring 32 and heating element 34. Ring 32 should be loosely thermally coupled to element 34, drawing enough heat from it so that it is always under thermal load. Land 41 separating heating element 34 from ring 32 will be in the range of 3 to 10 mm in radial thickness for most furnaces. No separation is required between element 34 and aperture 44. Land 41 separating the turns of a double heating element as depicted, is primarily for electrical insulation and is preferably as thin as structural characteristics of the insulating material and the electrical insulating requirements will allow.

Channel 46 is shown drilled in disk 40 at a 45° angle from the axis of grooves 45. Channel 46 receives thermal sensing element 47 having its sensor 48 positioned at the periphery of aperture 44. In the described embodiment as depicted in FIG. 1, the ring-disk pair (considering a ring, 32, and a disk, 40, as a pair) are sequentially rotated by 90°. Thus segment 36 of the first pair is shown rotated 45° from vertical, segment 36 of the second pair rotated 135° and the next two pairs have their segments 36 out of sight in FIG. 1, but shown in FIG. 2 being at 225° and 315° respectively. Provision for energy connections to each element 34 produces a discontinuity in the radial heat dissipation by the respective disk 32. Rotating the disks with respect to each other reduces the unbalance and improves the symmetry of dissipation. Other rotational sequencing that improves balanced heat dissipation may be used.

Figure 2:
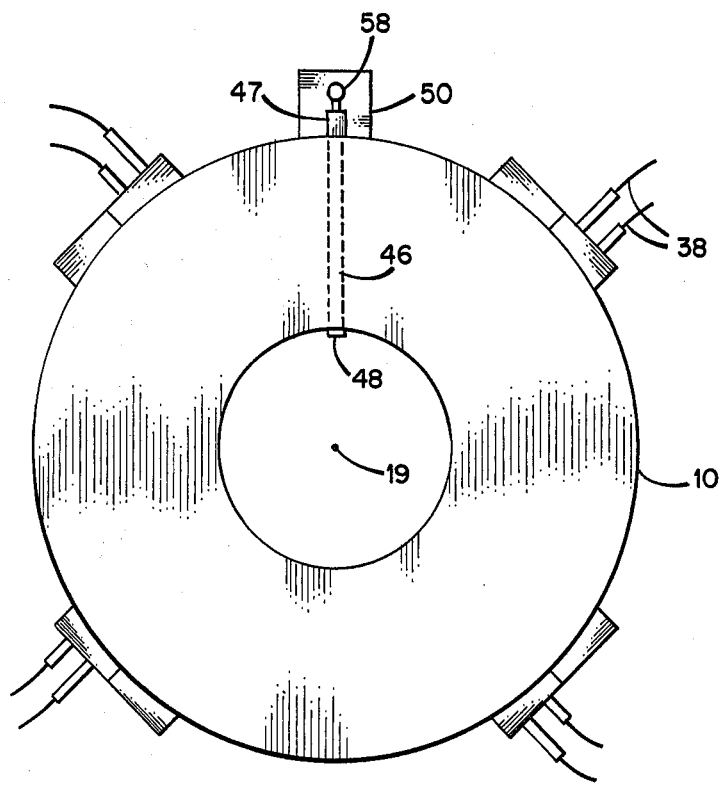
FIG. 2 is a cross-section taken along line 2—2 of FIG. 1.
Figure 7:
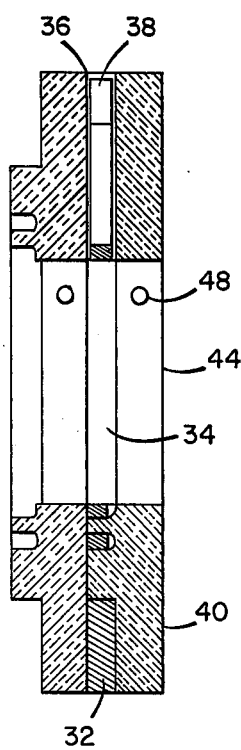
FIG. 7 is a cross-section of two insulating layers according to FIGS. 5 and 6 sandwiching a conductive annulus and a heating element according to FIGS. 3 and 4.

In FIG. 1, connections from thermal sensors 47 are all brought out into junction box 50. In order for these connections to line up, it will be understood that channels 46 are drilled at different locations in disks 40 relative to grooves 45. This is not critical, but is done as a matter of convenience since the location of the temperature sensors does not disturb the heat dissipation symmetry by any significant amount. The rotational positions of segments 36 and temperature sensors 47 are depicted in FIG. 2.

Referring again to FIG. 1, insulating ends 30 and 31 are capped with steel plates 54 and 55. Rods 56, extending through plates 54 and 55, serve as tie rods securing the furnace assembly tightly together. Leads 57 from the various heating element terminals and cable 58 from the temperature sensors connect to controller 60.

Figure 8:
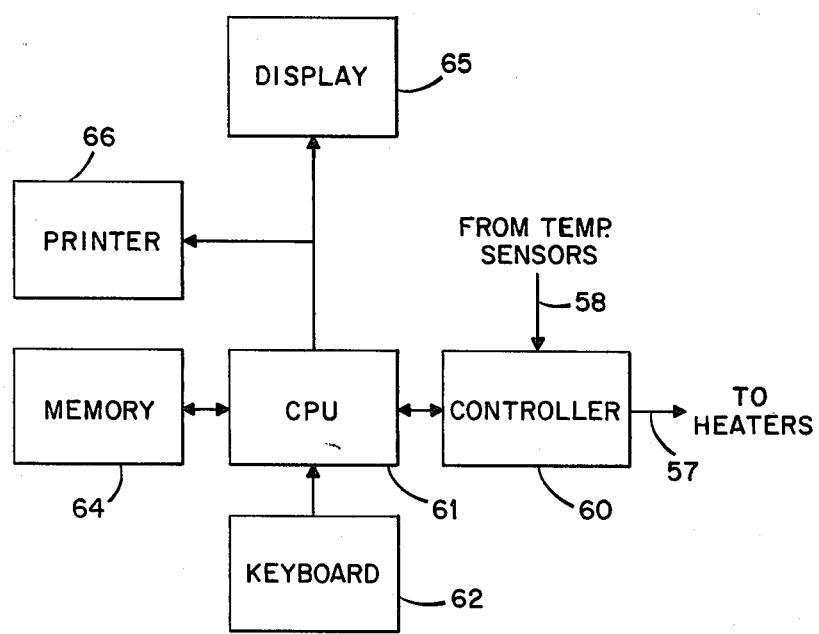
FIG. 8 is a block diagram of a control system for the inventive furnace.

Controller 60 is preferably operated by data processing apparatus as depicted in FIG. 8. In FIG. 8, central processing unit (CPU) 61 is connected to controller 60. CPU 61 has keyboard entry unit 62 which provides means of selecting and modifying programs in memory unit 64. CPU 61 operates under the selected program, driving controller 60 to produce the desired temperature gradient and movement of the gradient. Timing is effected by a clock built into CPU 61. CPU 61 also has outputs driving display 65 and printer 66 so that operation of the furnace can be monitored and reviewed. Temperature data from temperature sensors 47 is converted to appropriate input form for CPU 61 by converters that are depicted as located in controller 60. These converters can be separate or integral with CPU 61 in which case the connections would not necessarily be through controller 60. With this type of apparatus it has been found possible to produce complex curves of temperature gradients and even attain complex movements and changes in the gradients.

While FIG. 1 depicts all leads from furnace 10 going to a single controller unit, 60, the functions can be split between separate units. Silicon controlled rectifier switching devices are most common for switching or controlling power to electrical heating elements. Each heating element can have its own silicon controlled rectifier unit connecting the element to line power. Control signals to the silicon controlled rectifier units would then feed directly through an interface from the CPU. With fluid heating, the switching devices would be controllable valves.

A significant feature of the invention is that by adding thermal energy radially in discrete controlled layers, supplying at all times a net input of energy to the work volume, the effective thermal flow forming the controlled gradients is parallel to the bore axis and variations across the bore are negligible. By maintaining net heat input radially along the entire work volume of the furnace bore, heat losses from the bore are confined to the end or ends of the bore. To eliminate heat loss radially from the bore, insulating layers 20 through 28 are kept thin with an axial thickness in the range of 1 to 10 cm. The thickness is preferably 2 cm or less for steep gradient control. Heating elements such as element 34 will normally be thinner than the respective insulating layers to provide insulation between the elements. The diameter of insulating layers 20 through 28 is desirably at least double the diameter of aperture 44. A high diameter to thickness ratio of layers 20 through 28 reduces radial heat loss and permits the edges of layers 20 through 28 facing the furnace bore to maintain the temperature of the nearest heating element thus providing the same net energy input as the heating element. Some deviation can be expected especially since there will be a transition in each insulating layer from the temperature of the element on one side to the temperature of the element on the other.

Conductive annuli 11 through 18 must be in heat exchanging relationship with a heat dissipating medium. In FIG. 1 the heat dissipating medium is ambient air. As energy levels to be used increase, greater dissipation is necessary and is achieved by extending annuli 11 through 18 beyond layers 20 through 28 to act as fins, and/or by applying forced cooling air, water or other cooling medium. It will be understood that this external heat dissipation through the separate annuli is necessary to integrate and stabilize the temperature at each discrete layer with minimum crossover to adjacent layers.

Much steeper gradients have been achieved with furnaces according to the invention than is known to have been accomplished in prior furnaces. In a furnace having a 1.9 cm bore, a gradient going from 467° C. to 158° C. in an axial distance of 2.22 cm along the bore wall has been obtained. This gradient of 139° C. per cm compares with 79° C. per cm achieved with prior furnaces.

While the invention has been described with respect to a specific embodiment, variations within the skill of the art are contemplated as within the scope of the invention and it is intended to cover the invention as set forth in the scope of the following claims.

I claim:

1. A furnace having an interior space extending along an axis and a series of heating elements each oriented normal to said axis and extending around said space for providing controllable temperature gradients in said space comprising:

(a) A plurality of thermally conductive annuli;
(b) A plurality of thermally insulating layers separating said annuli and having central apertures defining said interior space;
(c) A plurality of heating elements, each sandwiched between two of said insulating layers and thermally coupled to a respective one of said annuli;
(d) Securing means securing said annuli, layers and elements together to enclose said interior space; and,
(e) Control means controllably connecting each of said elements to a source of energy.

2. A furnace according to claim 1 wherein each of said annuli is in contact with a heat dissipating medium.

3. A furnace according to claim 2 wherein each of said elements has leads passing radially outward of said annuli and layers for connection to a source of energy and wherein the locations at which said leads pass outward are rotated in a pattern to balance the discontinuities in heat dissipation produced by said leads.

4. A furnace according to claim 2 wherein said layers have lands and grooves for receiving said elements and each of said elements is supported securely between adjacent ones of said layers.

5. A furnace according to claim 2 wherein said control means is connected to the output of a data processing system providing programmed control of said furnace.

6. A furnace according to claim 1 further comprising a plurality of temperature sensors arranged to sense the temperature in said space at each said layer and connections between said sensors and said control means whereby energy input to each of said elements may be responsive to the temperature sensed.

* * * * *